Figure 1:
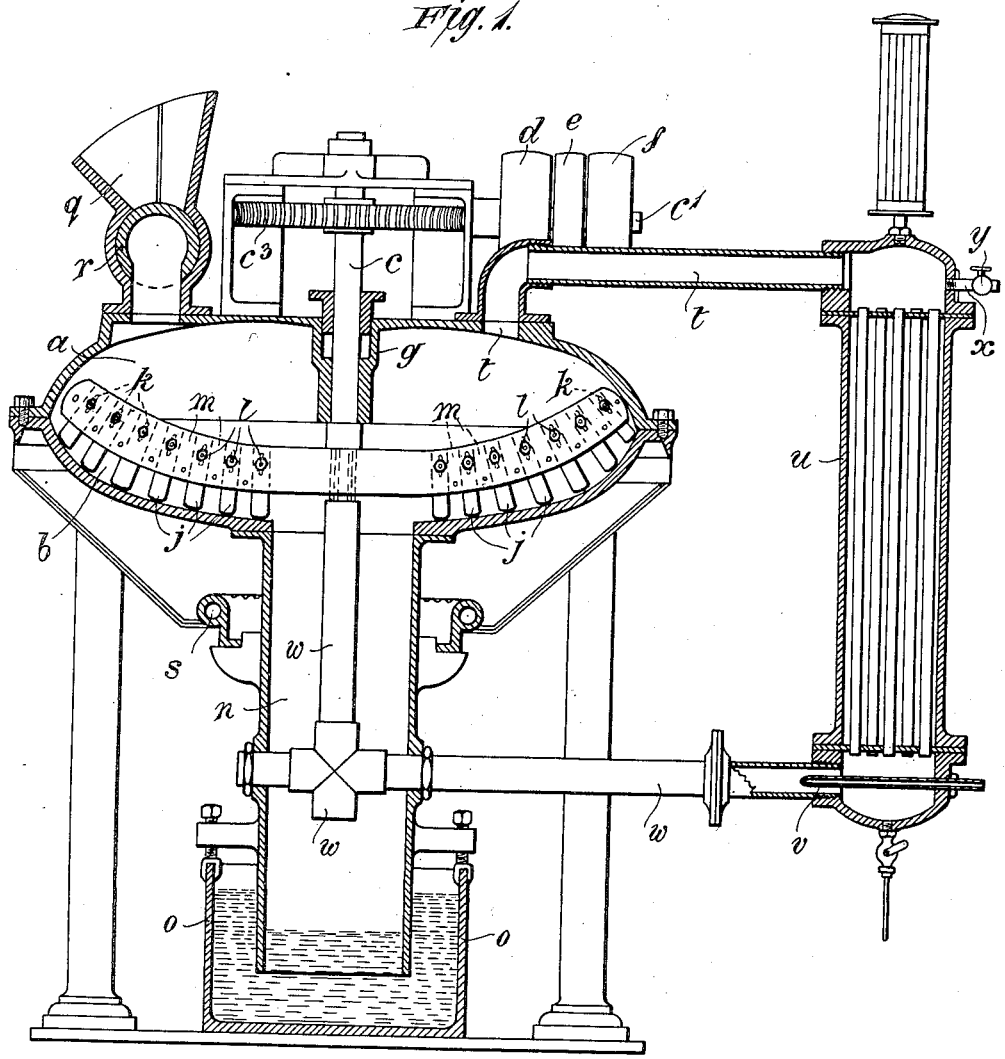

H. LANE.
APPARATUS FOR CARRYING OUT THE PREPARATION OF CATALYTIC MATERIAL EMPLOYED FOR THE PROMOTION OF SYNTHETIC CHEMICAL REACTIONS.
APPLICATION FILED OCT. 27, 1919.

1,428,965.

Patented Sept. 12, 1922.

3 SHEETS—SHEET 1.

H. LANE.
APPARATUS FOR CARRYING OUT THE PREPARATION OF CATALYTIC MATERIAL EMPLOYED FOR THE PROMOTION OF SYNTHETIC CHEMICAL REACTIONS.
APPLICATION FILED OCT. 27, 1919.

1,428,965.

Patented Sept. 12, 1922.

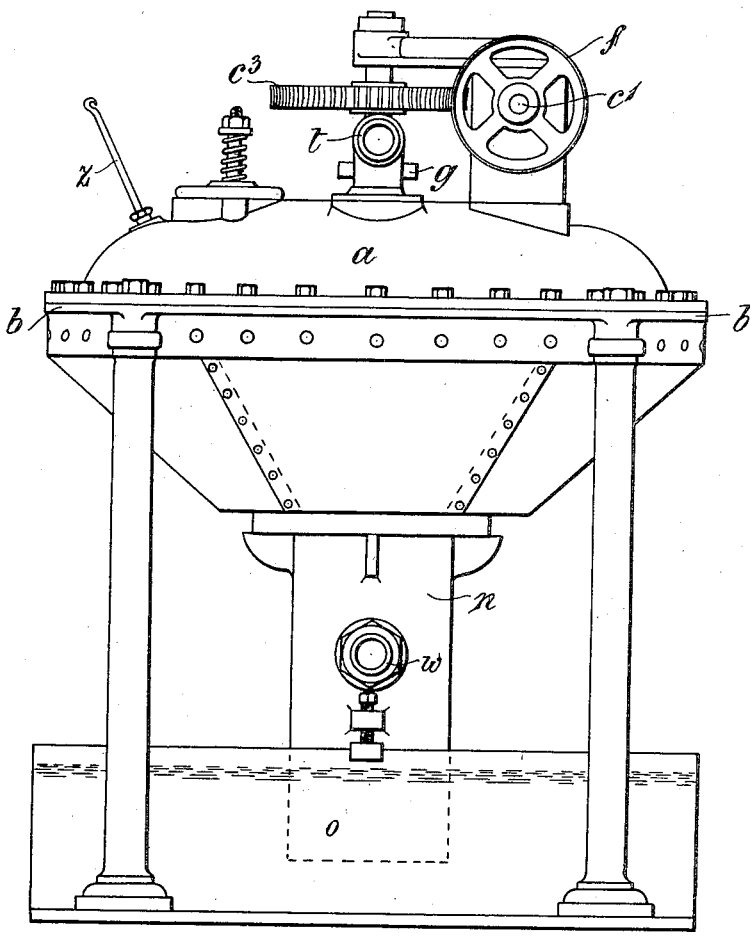

Patented Sept. 12, 1922.

1,428,965

UNITED STATES PATENT OFFICE.

HOWARD LANE, OF ASHFORD, ENGLAND.

APPARATUS FOR CARRYING OUT THE PREPARATION OF CATALYTIC MATERIAL EMPLOYED FOR THE PROMOTION OF SYNTHETIC CHEMICAL REACTIONS.

Application filed October 27, 1919. Serial No. 333,455.
(GRANTED UNDER THE PROVISIONS OF THE ACT OF MARCH 3, 1921, 41 STAT. L., 1313.)

*To all whom it may concern:*

Be it known that I, HOWARD LANE, a subject of the King of Great Britain, residing at The Laboratory, Ashford, Middlesex, England, have invented new and useful Improvements in the Apparatus for Carrying Out the Preparation of Catalytic Material Employed for the Promotion of Synthetic Chemical Reactions (for which I have filed applications in France May 3, 1918, Patent 489,943; Great Britian, June 11, 1917, Patent No. 115,924; and Holland, June 8, 1918); and I do hereby declare the following to be a full, clear, and exact description of the same.

My invention comprises improvements in the apparatus for carrying out the preparation of catalytic material employed for the promotion of synthetic chemical reactions and has for its object to provide an improved apparatus of this kind.

As an instance of such a catalytic material as I refer to I will mention the use of reduced nickel in a finely divided state for the synthesis of stearine by the combination of hydrogen gas with organic oils. Such reaction requires the use of a catalyst of the nature described but I do not confine my invention to that particular instance as it is a convenient method and apparatus for the production of various catalysts which are prepared by reduction with hydrogen or other gases or substances at an abnormal temperature, atmospheric air being excluded both during reduction and on conclusion of the process.

Hitherto difficulties in the preparation of catalysts have been met with both as to the charging and discharging of the apparatus with the material from which the catalyst is prepared. Many catalysts when exposed to the air forthwith deteriorate and become useless and moreover explosions even at normal temperature are liable to occur if air is present by reason of the pyrophoric nature of the material in question.

My improvements in apparatus for carrying out the method of operation consist in the provision and use of an apparatus comprising an air tight pan having an outlet which depends into a coating medium receptacle and containing a movable rake, scraper or the like member which is so formed as to cause the material in the pan to travel away from the outlet but which can be operated to cause material in the pan to travel to the outlet.

Referring to the drawings:—

Figure 2:
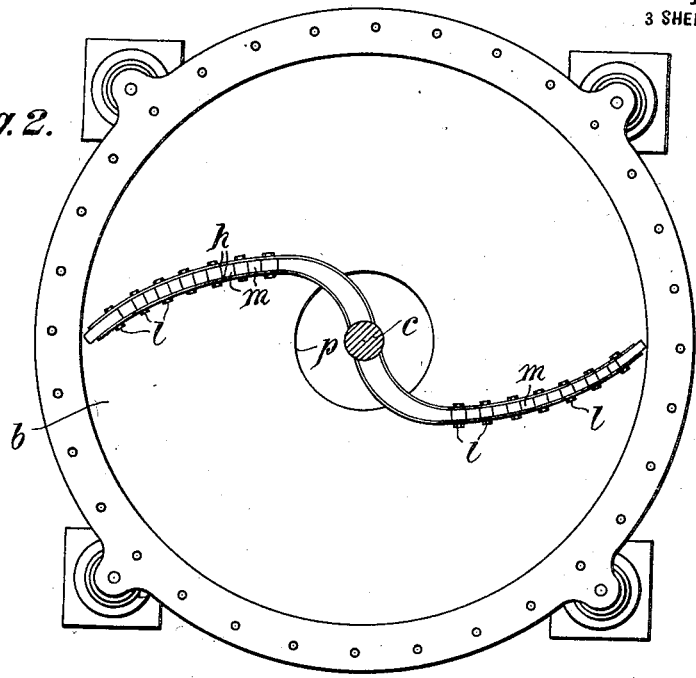
Figure 4:
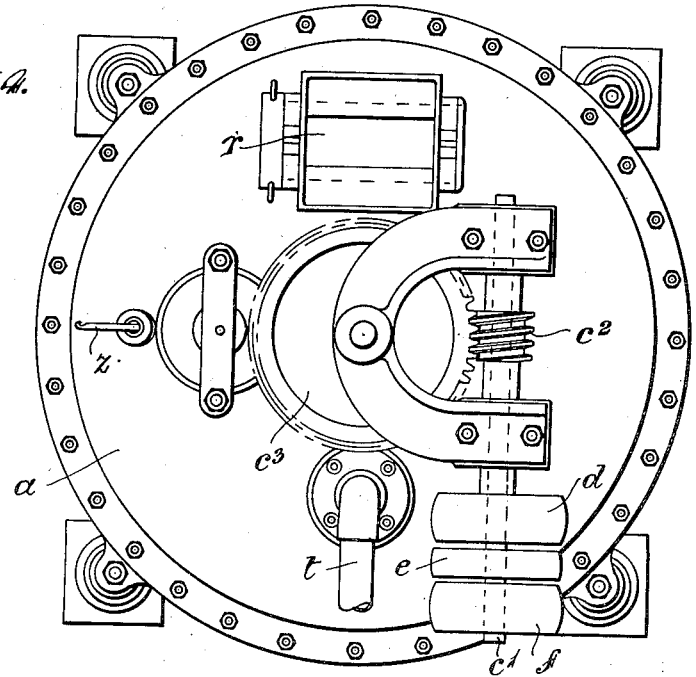

Figure 1 is a front elevation in section.
Figure 2 is a plan with the lid of the pan removed.
Figure 3 is a view in side elevation, and
Figure 4 is a view in plan.

Referring to the figures generally $a$, $b$ is a metallic circular covered air tight pan with a diameter considerably exceeding its depth. The cover $a$ of the pan is fitted with a vertical shaft $c$ operated with pulleys $d$, $e$, $f$ on a shaft $c^1$ carrying a worm $c^2$ gearing with a worm wheel $c^3$ mounted on the shaft $c$ or other mechanism permitting of reversal of movement. The shaft $c$ passes through a stuffing box $g$ on the pan cover $a$ and terminates within the pan $a$, $b$ with a rotary rake or scraper with one or more horizontal arms. In the drawing two arms $h$ and $i$ are shown. The arms $h$ and $i$ of the rotating rake are curved helically in such a way that when the rotation is in one direction the material within the pan $a$, $b$ is caused to distribute towards the periphery of the pan $a$, $b$, and yet when the direction of the curved rake is reversed the material is scooped or stirred and travels towards the centre of the pan. The teeth $j$ of the curved rake are preferably loose so that they follow any irregularities in the surface of the pan without undue pressure or friction. In the drawing this play is obtained by forming slots $k$ in the teeth $j$ and mounting these teeth on bolts $l$ between fixed distance pieces $m$. In the case of rakes with more than one arm the teeth $j$ are staggered on the hit and miss principle and a more complete and efficient stirring of the material is so obtained. As the pan $a$, $b$ is curved in vertical cross section approximating to an ellipse with an increasing declivity towards the margin, the outward movement of the material caused by the rake $h$, $i$ is arrested towards the margin of the pan, the material falling back by gravity. The pan at its centre is provided with an outlet aperture $p$ down which the material falls when the rake $h$, $i$ is reversed. The aperture $p$ is continued downwards as a vertical pipe or shaft $n$ and terminates by dipping into a reservoir or cistern $o$ which contains oil or other coating medium into which the catalyst material is precipitated after its reduction has been completed. By means of this fluid seal the material is withdrawn from the apparatus without obtaining access to the interior of same. After the coating or wetting, the material may be exposed to the atmosphere without risk or injury.

The closed cover of the pan is fitted with a trapped hopper or feeding device by which the raw or unreduced catalyst material may be introduced into the pan. In the drawing the feeding device consists of a hopper $q$ having a cylindrical enlargement in which a cylindrical receiver $r$ is fitted to rotate. When the receiver $r$ is rotated a half turn from the position shewn in Figure 1, material will fall from the hopper into the same and the contents of the receiver $r$ can be then emptied into the pan $a, b$ by imparting another half turn to the receiver which however in all positions shuts off air from the interior of the pan. The pan $a, b$ is heated from below by means of an annular furnace or gas burner ring $s$. The cover $a$ of the pan is provided with a gas outlet $t$ which in turn is connected with a condenser $u$ which separates moisture from the gas which, if so desired for reasons of economy may be returned to the pan through the aperture $p$ in its base, being induced so to go by the action of the jet $v$ which supplies also fresh quantities of reducing gas. The reducing gas is propelled through the pipe $w$ to the interior of the pan $a, b$.

In order to operate my improved apparatus oil or other coating substance is in the first place poured into the seal in sufficient quantity to cover the lower extremity of the down shaft $n$ from the pan $a, b$. The air is then displaced from the pan by admitting hydrogen or other gas to be employed the air passing away through the waste pipe $x$ and valve $y$.

The rotating rake $h, i$ is next put in action in the charging direction and sufficient supplies of the raw material are fed into the pan $a, b$ through the trapped hopper. The annular furnace or ring gas burner $s$ is next lighted up and adjusted to impart a suitable temperature to the pan and its contents which is ascertained by means of a thermometer $z$ inserted in the cover of the pan. The waste gas pipe $x$ is wholly or partially closed by means of the valve according to the method of working adopted and the jet $v$ supplying further quantities of fresh reducing gas is opened. The time needed for the reduction of the charge depends upon circumstances but usually this is determined by the cessation of the water drip from the condenser $u$ this indicating that reduction is complete.

The next operation is to reverse the direction of rotation of the distributing rake $h, i$ which will now collect the material towards the centre of the pan and discharge same down the central aperture $p$ into the coating fluid or medium from which it is withdrawn by suitable ladles through the seal without allowing air to obtain access. A further charge of material is next deposited in the pan $a, b$ and the process is repeated indefinitely and without opening the pan to the atmosphere.

What I claim then is:—

1. Apparatus for carrying out the preparation of catalytic material employed for the promotion of synthetic chemical reactions comprising an air-tight pan a dished bottom to the said pan, an inlet opening to said pan, a central outlet in the said dished bottom which outlet depends into a coating medium receptacle, a movable curved rake disposed within the pan and operable from the exterior of the pan, said rake being formed so that when moved in one direction it causes the material in the pan to move away from the outlet but when moved in another direction it causes the material in the pan to move to the outlet opening.

2. Apparatus for carrying out the preparation of catalytic material employed for the promotion of synthetic chemical reactions comprising an air-tight pan a dished bottom to the said pan, an inlet opening to said pan, a central outlet in the said dished bottom which outlet depends into a coating medium receptacle, means for introducing reducing gas into the air-tight pan, an outlet from said pan for residual gas and vapour, said outlet communicating with a condenser for condensing the vapour, means, employing fresh reducing gas as motive power, for causing said residual gas, after being freed from moisture, to be automatically re-introduced into the air-tight pan, a movable curved rake disposed within the pan and operable from the exterior of the pan, said rake being formed so that when moved in one direction it causes the material in the pan to move away from the outlet but when moved in another direction it causes the material in the pan to move to the outlet opening.

3. Apparatus for carrying out the preparation of catalytic material employed for the promotion of synthetic chemical reactions comprising an air-tight pan, an inlet opening to said pan, an outlet from said pan which outlet depends into a coating medium receptacle, a movable rake disposed within the pan and operable from the exterior of the pan, loosely mounted teeth in said rake, said rake being formed so that when moved in one direction it causes the material in the pan to move away from the outlet but when moved in another direction it causes the material in the pan to move to the outlet opening.

4. Apparatus for carrying out the preparation of catalytic material employed for the promotion of synthetic chemical reactions comprising an air-tight pan a dished bottom to the said pan, an inlet opening to said pan, means for feeding material through said opening without admitting air to said pan, a central outlet in the said dished bottom which outlet depends into a coating medium receptacle, a movable curved rake disposed within the pan and operable from the exterior of the pan, said rake being formed so that when moved in one direction it causes the material in the pan to move away from the outlet but when moved in another direction it causes the material in the pan to move to the outlet opening.

5. Apparatus for carrying out the preparation of catalytic material employed for the promotion of synthetic chemical reactions comprising an air-tight pan, a dished bottom to the said pan, an inlet opening to said pan, a central outlet in the said dished bottom which outlet depends into a coating medium receptacle, a movable curved rake disposed within the pan and mounted on a reversible shaft operable from the exterior of the pan, loosely mounted teeth in said rake, said rake having at least one arm which extends outwardly in the form of a curve so that when moved in one direction it causes the material in the pan to move away from the outlet but when moved in another direction it causes the material in the pan to move to the outlet opening.

In testimony whereof I affix my signature in presence of two witnesses.

HOWARD LANE.

Witnesses:
 CHARLES S. PARSONS,
 S. W. HART.